(12) United States Patent
Nister (10) Patent No.: US 7,271,827 B2
(45) Date of Patent: Sep. 18, 2007

(54) SYSTEM AND METHOD FOR RECORDING MOVING IMAGES

(75) Inventor: David Nister, Plainsboro, NJ (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 771 days.

(21) Appl. No.: 10/416,640

(22) PCT Filed: Oct. 11, 2001

(86) PCT No.: PCT/SE01/02215

§ 371 (c)(1),
(2), (4) Date: May 13, 2003

(87) PCT Pub. No.: WO02/41632

PCT Pub. Date: May 23, 2002

(65) Prior Publication Data

US 2004/0008264 A1 Jan. 15, 2004

(30) Foreign Application Priority Data

Nov. 16, 2000 (SE) .................................. 0004220

(51) Int. Cl.
*H04N 5/225* (2006.01)
(52) U.S. Cl. .................................................... 348/169
(58) Field of Classification Search ........ 348/169–172, 348/208.11
See application file for complete search history.

(56) References Cited

U.S. PATENT DOCUMENTS

| 4,980,871 | A | * | 12/1990 | Sieber et al. ............... 367/127 |
| 5,012,335 | A | * | 4/1991 | Cohodar ....................... 348/158 |
| 5,223,875 | A | * | 6/1993 | Yanagisawa ................. 348/169 |
| 5,361,115 | A | * | 11/1994 | Ohtsuka et al. .............. 396/58 |
| 5,438,357 | A | * | 8/1995 | McNelley ................... 348/14.1 |
| 5,570,177 | A | * | 10/1996 | Parker et al. ................ 348/169 |
| 5,699,442 | A | * | 12/1997 | Fellinger ..................... 348/169 |
| 6,014,167 | A | * | 1/2000 | Suito et al. .................. 348/169 |
| 6,162,191 | A | | 12/2000 | Foxlin |
| 6,437,820 | B1 | * | 8/2002 | Josefsson .................... 348/169 |

(Continued)

FOREIGN PATENT DOCUMENTS

EP 0 689 357 A1 12/1995

(Continued)

*Primary Examiner*—Vivek Srivastava
*Assistant Examiner*—Jason Whipkey (57) ABSTRACT

The present invention relates to the recording of moving images by means of a portable communication device, such as a videophone. The communication device includes a main device (101), comprising a video camera (105). Furthermore, an accessory device (102), such as a headset, is also associated with the main device (101) and co-located with a relevant object (103). The video camera (105) records an original image of the relevant object (103). At least one tracking point (107a) is located on the accessory device (102) and at least one automatic tracking sensor (108a-108c) responsive to the at least one tracking point is located on the main device (101). The main device (101) further comprises a tracking data generator, which receives signals from the automatic tracking sensor(s) (108a-108c) and generates in response thereto tracking data representing a target direction (104) between the main device (101) and the accessory device (102). An image controller in the main device (101) creates a stabilized image of the relevant object (103) based on the target direction (104) and an original image recorded by the video camera (105).

30 Claims, 3 Drawing Sheets

U.S. PATENT DOCUMENTS

| | | | |
|---|---|---|---|
| 7,035,418 B1* | 4/2006 | Okuno et al. | 348/169 |
| 7,173,650 B2* | 2/2007 | Cohen-Solal et al. | 348/172 |
| 2001/0034222 A1* | 10/2001 | Roustaei et al. | 348/14.12 |
| 2003/0169339 A1* | 9/2003 | Allen et al. | 348/169 |
| 2006/0284792 A1* | 12/2006 | Foxlin | 345/8 |

FOREIGN PATENT DOCUMENTS

| | | |
|---|---|---|
| EP | 0 884 905 A2 | 12/1998 |
| WO | WO 00/56070 | 9/2000 |

* cited by examiner

SYSTEM AND METHOD FOR RECORDING MOVING IMAGES

BACKGROUND OF THE INVENTION

The present invention relates generally to the recording of moving images by means of a portable communication device. More particularly the invention relates to a method of producing an enhanced image of a relevant object recorded by a video camera.

The increasing capacities to transport high bandwidth signals in the fixed and mobile communication networks make mobile video telephony an increasingly viable application. A mobile videophone typically includes means for recording a movable image of the phone's user and means for presenting a corresponding movable image of at least one other person with whom the user communicates.

Audio information, for instance in the form of voice signals, is normally also communicated during a mobile videophone call. Therefore, means for duplex communication of audio information are also included in the videophone. Since the image recording means in the videophone requires that the videophone (or at least a device thereof including a camera, which typically is the main device) be placed at a particular minimum distance from the user, the sound information cannot be recorded by a regular microphone, such as those used in standard audio telephones.

The sound information must instead be exchanged between the user and main device either by means of a voice controlled microphone-loudspeaker arrangement or by means of a headset, which includes a microphone (positioned in proximity of the user's mouth) for receiving audio information and at least one earpiece (positioned in proximity of the user's ear(s)) for transmission of audio information to the user. A headset provides a higher degree of privacy than the microphone-loudspeaker arrangement. In most cases, the headset also provides a higher audio quality. The headset may, of course, prove impractical for certain applications. Wireless headsets (e.g. communicating via a Bluetooth interface), nevertheless, overcome the majority of the limitations associated with cable-connected headsets.

Consequently, there exit satisfying solutions for communicating voice signals also via mobile videophones. Unfortunately, there are yet no sufficiently good solutions for recording a moving image of the videophone user.

It is generally desirable that an object regarded as relevant for the videophone call (i.e. in most cases the face of the user) is recorded in such manner that it covers a substantial part of the available image area.

During a call the videophone user may either hold the videophone in his/her hand and point the phone's camera in the general direction of his/her face or alternatively place the phone on a stationary object in front of him/her in such manner that phone's camera is able to record images the user's face. In the first case movements of the user's hand and or upper body may cause the user's head to occasionally (at least partly) fall out of picture (i.e. outside the video camera's angular recording range). In any circumstances, the image of the user will most probably be more or less shaky. In the second case the image is inclined to be more stable, however, the risk that the user moves out of picture is at least as large as in the former case, particularly since the camera has a comparatively narrow angular recording range in order to fulfil the requirement that the relevant object should cover a relatively large part of the total image area. The measures previously taken to alleviate these problems involve the following three techniques.

A first alternative is to digitally analyse an image recorded by a video camera and create a stabilized image by processing a series of consecutively recorded image frames, extracting image features that are estimated to represent relevant information and generating enhanced moving images in which, for instance, the effects of shakes are reduced. This solution is based on complex calculations and hence demands a high processing capacity. That, in turn, means high costs and/or high power consumption. Furthermore, it is not certain that the image processing algorithms detect the correct relevant information and thus enhance the moving images in a desirable manner.

A second alternative to decrease the effects of shakes is to stabilize the camera in the videophone mechanically. This, however, either implies a bulky arrangement including a multitude of engines and complex levers or weights of impractical magnitude to be included in the videophone. Therefore, this solution is not interesting from a practical point of view.

A third alternative to decrease the effect of shakes is to attach the videophone camera to a rod, which is connected to a helmet worn by the user. This is, no doubt, an efficient way to produce a stable stabile image of user's face. Nevertheless, the solution is not likely to attain a high consumer interest, since the solution will probably be perceived as impractical and not very discrete.

The patent literature includes a few examples of applications outside the field of video communication in which headsets are used to adaptively convey information to a user. These examples are not directly related to the field of the present invention. However, they touch upon problems and solutions that are related to some aspects of the present invention.

For instance, the U.S. Pat. No. 4,866,229 discloses an apparatus for transmitting optical information from an essentially stationary transmitter to a viewer's movable headset. The solution is typically used to superimpose map information on directly observable information in the surroundings of an aircraft pilot. The transmitter tracks the headset and directs its optical information beam to the headset by means of a light source and a tracking guide sensor in the transmitter respective a tracking guide reflector in the headset.

The patent document JP, A, 8102702 describes a radio signal transmission system in which a headset includes two radio transmitters for producing radio signals with horizontal and vertical waveform directivity respectively. A detection device, which receives the radio signals from the headset, determines the orientation of the headset on basis of the different strengths of the respective radio signals.

The U.S. Pat. No. 5,619,582 discloses a system for enhancement of audio information in a concert environment involving a wireless headphone system. Multiple radio channels are transmitted to the audience of which all channels contain the same acoustic signal, however for each channel the signal is delayed by a different preset time period. The time of arrival of at least two radio frequency pulses are compared in order to locate the position of a particular headphone receiver in relation to the transmitter. On basis of this position the headphone receiver chooses a suitably delayed radio channel such that the decoded audio signal is approximately in phase with the sound arriving from the main speakers at the stage.

Despite the fact that the videophone communication technology and mobile communication solutions have been known for decades there still exists no example of a mobile videophone solution, which is both capable of producing and maintaining a stable image of a relevant object and is attractive to a user from a practical point of view.

SUMMARY OF THE INVENTION

The object of the present invention is therefore to alleviate the problems discussed above by providing a method and a comparatively simple arrangement that make possible the generation of an enhanced image of a relevant object without impairing an easy use of the equipment.

According to one aspect of the invention the object is achieved by a method of producing an enhanced image of a relevant object recorded by a video camera as initially described, which presupposes that at least one tracking point is located either on the main device, on the accessory device or on both. Moreover, it is presupposed that an automatic tracking sensor responsive to the at least one tracking point is located on at least the device of the main device and the accessory device on which the tracking point is not located. However, an automatic tracking sensor may also be located on that device for redundancy reasons. The method is further characterised by generating tracking data representing a target direction between the main device and the accessory device on basis of signals received by the at least one automatic tracking sensor. A stabilized image of the relevant object is then created by processing an original image recorded by the video camera based on the target direction.

According to another aspect of the invention the object is achieved by a computer program directly loadable into the internal memory of a computer, comprising software for controlling the method described in the above paragraph when said program is run on a computer.

According to yet another aspect of the invention the object is achieved by a computer readable medium, having a program recorded thereon, where the program is to make a computer perform the method described in the penultimate paragraph above.

According to an additional aspect of the invention the object is achieved by a communication arrangement as initially described, which is characterised in that at least one tracking point is located either on the main device, on the accessory device or on both. At least one automatic tracking sensor responsive to the at least one tracking point is located on at least the device of the main device and the accessory device on which the tracking point is not located. However, an automatic tracking sensor may also be located on that device for redundancy reasons. The main device comprises a tracking data generator, which receives at least one signal from the at least one automatic tracking sensor and generates, in response thereto, tracking data representing a target direction between the main device and the accessory device. The main device also comprises an image controller, which creates a stabilized image of the relevant object based on the target direction and an original image recorded by the video camera.

The proposed solution thus ensures a stable tracking of a relevant object, such as the head of a user, from a portable main device without requiring any additional devices that might cause inconvenience to the user.

This, of course, makes the invention attractive for mobile video telephony applications from a technical point of view as well as from a commercial point of view.

BRIEF DESCRIPTION OF THE DRAWINGS

The present invention is now to be explained more closely by means of preferred embodiments, which are disclosed as examples.

DESCRIPTION OF PREFERRED EMBODIMENTS OF THE INVENTION

Figure 1:
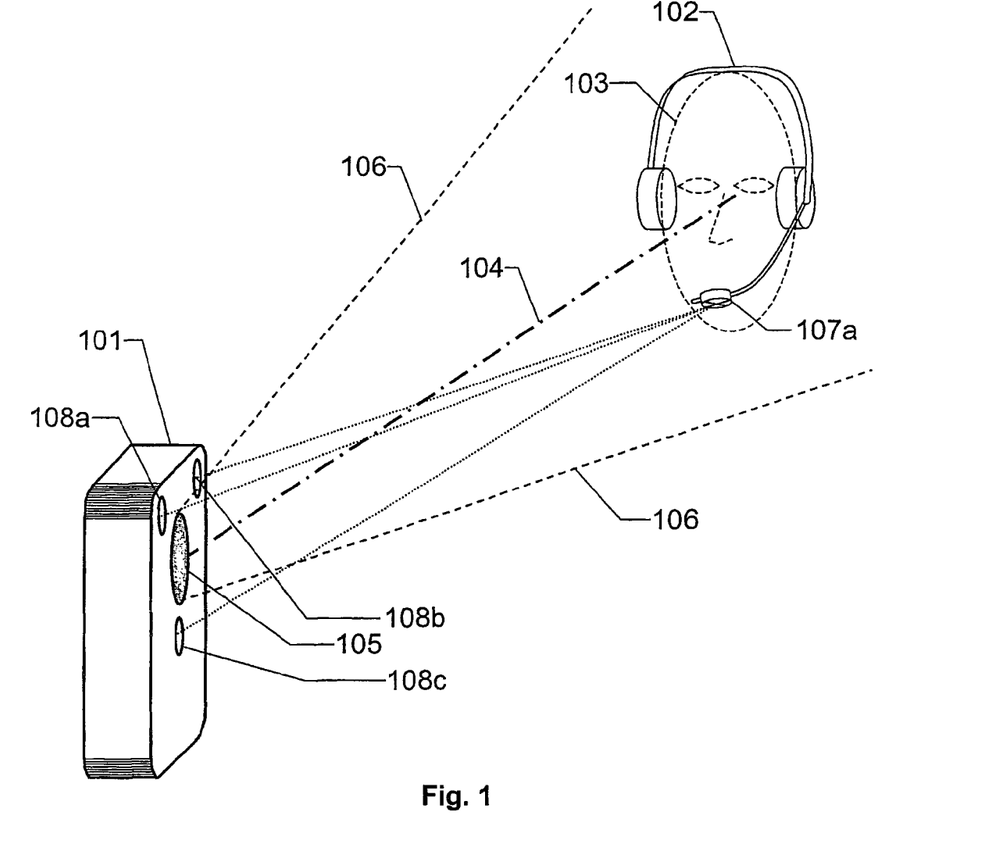
FIG. 1 shows a communication arrangement according to a first aspect of the invention.

FIG. 1 shows a communication arrangement according to a first aspect of the invention. The communication arrangement includes a main device 101 and an accessory device 102, which is associated with the main device either physically by means of a cable or logically via a wireless connection. Such wireless connection can be accomplished by radio resources (e.g. a Bluetooth interface), an optical link or by means of a magnetic inductive link.

A video camera 105 is included in the main device 101 in order to record an original image of a relevant object 103, which typically is the face of the user who communicates via the communication arrangement. The video camera 105 has an angular recording range 106 that is relatively wide. This namely increases the probability of finding the relevant object (somewhere) within the camera's 105 recording range 106. The accessory device 102 is co-located with the relevant object 103. The FIG. 1 shows an accessory device 102 in the form of a headset worn by the user whose face here represents the relevant object 103. Theoretically, the relevant object may be any other object, which at least temporarily, is regarded as important during the videophone call.

At least one tracking point 107a is located on the accessory device 102. The tracking point 107a constitutes a reference target, which the camera 105 in the main device 101 should track as well as possible in course of the call. It is therefore preferable to place the tracking point 107a as close as possible to the relevant object 103. In this example the tracking point 107a is located on a microphone piece in the proximity of the user's mouth. However, any other positioning on the accessory device 102 is conceivable, such as on a cable connecting the accessory device 102 with the main device 101. Multiple tracking points may also be attached to the accessory device to introduce a degree of redundancy, such that one or more of the tracking points may be obscured without a severe deterioration of the tracking performance. If signals from several tracking points are registered simultaneously a resulting virtual tracking point is assumed to be located in an average direction between the detected tracking points.

At least one automatic tracking sensor 108a, 108b respective 108c, which is responsive to the tracking point 107a is located on the main device 101. Each tracking sensor 108a-108c receives a signal from the tracking point 107a. Hence, it is possible to derive a direction from the main device 101 towards the accessory device 102 by studying the respective signals received by different tracking sensors 108a-108c. If the main device comprises three or more tracking sensors 108a-108c it is possible to determine a three-dimensional direction vector to the accessory device 102 by means of a triangulation calculation. Such direction vector is regarded to represent a target direction 104 between the main device 101 and the accessory device 102. If two or less tracking sensors are included in the main device 101 it is not possible to define a target direction 104 in three-dimensions. However, depending on the type of sensor and tracking point used the target direction 104 could still have a sufficient accuracy. Once the target direction 104 is derived it is possible to select a part of an original image recorded by the video camera 105, which basically includes only the relevant object 103. According to the invention, this selection is performed with sufficiently short intervals to produce an image of the relevant object 103, which is perceived as acceptably stabile by a human viewer.

The tracking point 107a respective the automatic tracking sensors 108a-108c may be designed by means of many alternative or complementary technologies. According to a preferred embodiment of the invention, the tracking point is constituted by a light source, such as a LED (Light Emitting Diode) and the automatic tracking sensors 108a-108c include light sensors that are sensitive in a wavelength spectrum, which is relevant with respect to the light emitted from the tracking point light source.

A very efficient realisation of this embodiment is obtained if the video camera 105 also operates as a tracking sensor. The video camera 105 thus registers light signals from the tracking point 107a. It is furthermore preferable if the light source in the tracking point 107a emits a flashing/pulsating light according to a particular known sequence. An image-processing algorithm can then find the tracking point 107a in the original image recorded by the video camera 105 by correlating the original image data with the known sequence. A relatively high flashing/pulsating rate is desirable, since this both results in a low tracking delay and is also more likely to be perceived by a human eye as a stable light. For instance, provided that the video camera operates at a frequency of 60 Hz, it would be suitable to choose a flashing/pulsating rate such that the light source is "on" every second image frame and "off" every second image frame.

It is also possible to make the tracking point 107a passive, i.e. merely being a reflector for light sent out from a light source located elsewhere, preferably on the main device 101. This light source may either emit visible light or produce light outside the visible spectrum. In any case, the automatic tracking sensor (which again could be the video camera 105) must have a range of sensitivity, which is adapted for the wavelength of the light sent out from the light source.

A particular marker on the accessory device 102 having a known and well-defined appearance constitutes an important example of a passive tracking point 107a. Naturally, any logotype or corresponding characterising design may thus function as a marker. The light reflected by this marker need not be sent out from the main device 101, but could very well be the ambient light that illuminates the relevant object 103.

According to another preferred embodiment of the invention, the tracking point 107a is constituted by a magnetic component and the automatic tracking sensors 108a-108c include magnetic field sensors.

According to yet another preferred embodiment of the invention, the tracking point 107a is constituted by an ultra-sound generator, and the automatic tracking sensors 108a-108c each includes a microphone for reception of ultra-sonic sounds.

According to still another preferred embodiment of the invention, the tracking point 107a is constituted by a radio transmitter and the automatic tracking sensors 108a-108c each includes a radio receiver.

In case multiple tracking points are used, the signals transmitted by the different tracking points should be modulated differently in order to facilitate the extraction of orientation information from the signals received by the automatic tracking sensors. The modulation can naturally be varied regardless of the type of signal sent out from the tracking points. Moreover, if the number of tracking points is increased, the number of automatic tracking sensors may be reduced to a corresponding extent for a given degree of tracking resolution.

If, when initiating a videophone call, the camera in the main device is pointed towards the relevant object such that the relevant object is located within a well-defined area of the recorded image it is not necessary to track the relevant object directly. Instead, the relevant object may be tracked indirectly by registering signals from accelerometers (or inertial sensors) in the main device and the accessory device respectively, which indicate relative movements from the known initial positional-directional relationship between the main device and the accessory device.

Hence, according to another preferred embodiment of the invention at least one tracking point in the accessory device includes an accelerometer and at least one automatic tracking sensor in the main device includes an accelerometer. An updated positional-directional relationship can be derived by regularly comparing signals generated by the at least one tracking point accelerometer with signals generated by the at least one automatic tracking sensor accelerometer.

Although the tracking point(s) and the automatic tracking sensor(s) may solely include accelerometers, it is desirable to use one or more of the other types of tracking point(s)/sensor(s) combinations described above as the main means for accomplishing the tracking and utilise the accelerometers as a complement thereto.

Figure 2:
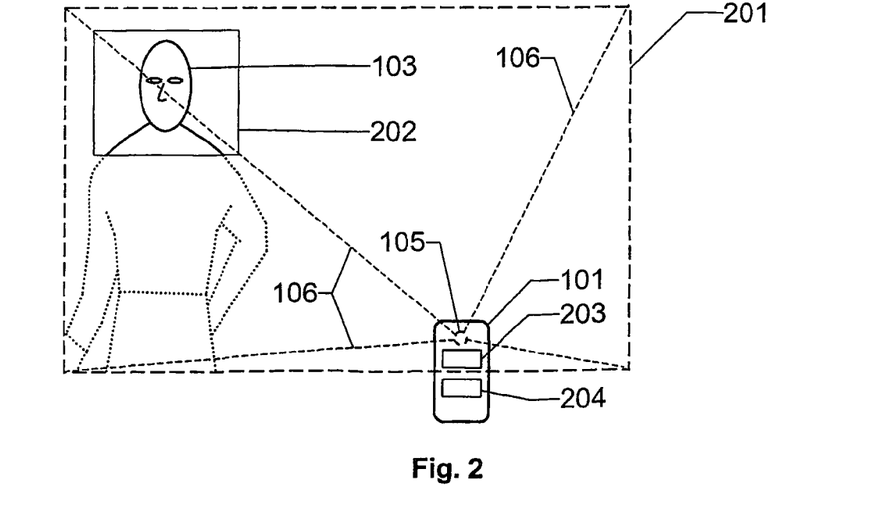
FIG. 2 illustrates how a stabilized image of a relevant object is created according to a first embodiment of the invention.

FIG. 2 illustrates in further detail how a stabilized image of a relevant object 103 can be created according to the invention. The video camera 105 in the main device 101 has a relatively wide angular range 106 for recording moving images. This is illustrated by an original image 201 covering a comparatively large area. A tracking data generator 203 in the main device 101 processes the signals received by the tracking sensors and derives a target direction between the main device 101 and the accessory device. An image controller 204 in the main device 101 then adaptively selects a particular portion 202 of the original image 201 recorded by the video camera 105 based on the target direction. The selected portion 202 is, of course, chosen such that it includes the relevant object 103 and not very much more. The selected portion 202 is adaptively selected in a sense that the selected image area varies as the main device 101 and/or the accessory devices moves and the target direction is updated correspondingly. The image controller 204 updates the selected portion 202 with sufficiently short intervals to produce an image of the relevant object 103, which is perceived as stable by a human viewer.

Figure 3:
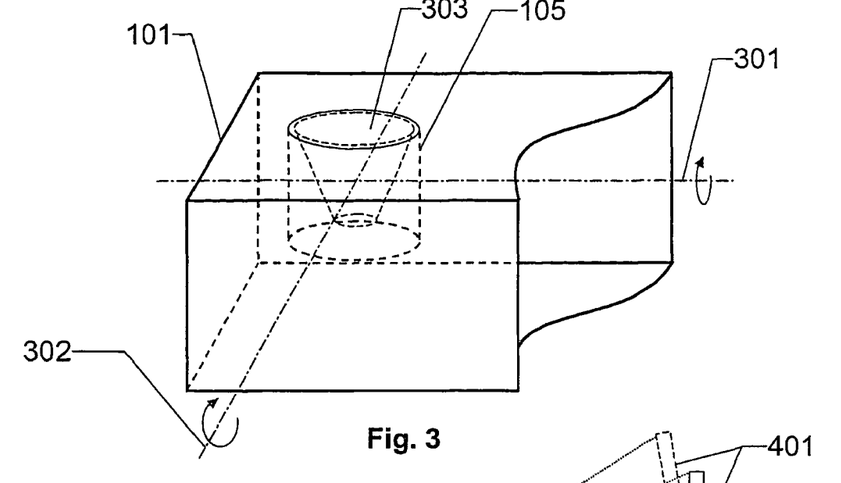
FIG. 3 illustrates how a stabilized image of a relevant object is created according to a second embodiment of the invention, FIG. 4 demonstrates a first aspect of the embodiment shown in FIG. 3, FIG. 5 demonstrates a second aspect of the embodiment shown in FIG. 3.

FIG. 3 illustrates how a stabilized image of a relevant object can be created according to a second preferred embodiment of the invention. In this embodiment, at least an image-forming element 303 in the camera 105 is tiltable relative to the main device 101 around at least a first axis 301. This makes it possible for the camera 105 to track the relevant object's 103 movements along any line being perpendicular to the first axis 301. The camera's 105 effective angular range for recording images can thus be widened. Alternatively, a camera 105 having a less wide angular recording range can be utilised to cover an image that otherwise would have required a wider angular recording range. As a result, an improved image resolution and thus also higher image quality is acquired. The image forming element 303 includes one or more beam refractive units (such as lenses or corresponding holograms) via which light rays reflected by objects outside the camera 105 are directed towards an image receptive element (e.g. a CCD-image sensor (CCD=Charge Coupled Device)) inside the camera 105. Preferably, the image-forming element 303 is also tiltable around a second axis 302, such that the camera 105 may track movements in two dimensions.

This embodiment of the invention can be regarded either as an alternative to the first embodiment, described with reference to FIG. 2 above, i.e. to track the relevant object 103 within the original area 201, or as a complement to the first embodiment, i.e. to further extend the original image area 201 covered by a stationary image forming element 303.

Figure 4:
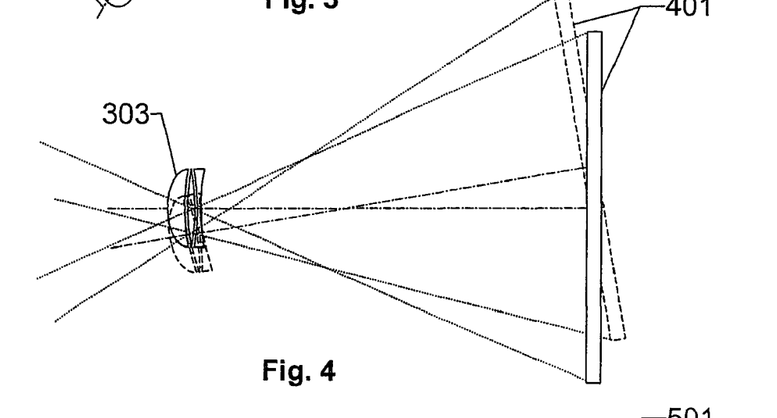

FIG. 4 illustrates a first aspect of the embodiment shown in FIG. 3 where, besides an image-forming element 303 being tiltable, an image receptive element 401 is also tiltable to a corresponding extent. The effect of such tilting is that an enlarged image reception area may be obtained without introducing any additional distortion. A possible disadvantage is, however, that the number of moving parts within the camera 105 is slightly higher than what is absolutely necessary.

Figure 5:
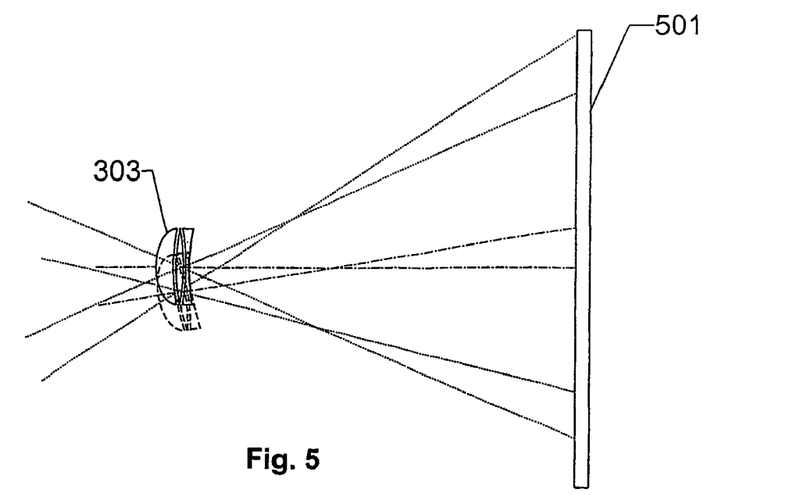

FIG. 5 illustrates a second aspect of the embodiment shown in FIG. 3 where only the image-forming element 303 is tilted and the image receptive element 501 is stationary. The image reception area must be made larger than what it would have had to be if the image-forming element 303 were not tiltable. According to this aspect of the invention, a part of the image receptive element 501 will always be unused. Furthermore, the image will be distorted to a degree corresponding to the tilting angle of the image-forming element 303. The image controller will thus have to allocate a part of its processing resources to compensate for this distortion. However, the number of moving parts in the camera 105 is kept to a minimum, which of course, is advantageous from manufacturing and reliability point of view.

Irrespective of which of the methods described with reference to the FIGS. 2-5 above that is utilised to track the relevant object 103, the image controller 204 may also include an image processor to further enhance the quality of the stabilized image. The image processor combines data from two or more consecutively recorded images and generates there from a resulting image having an improved quality.

The above proposed tilting of at least an image-forming element may compensate for movements and direction shifts of the main device 101 from an ideal direction up to a particular offset magnitude. If, however, the main device 101 is placed in such manner or if the relevant object 103 moves such that it falls outside a widest possible original image 201 the communication arrangement is incapable of creating an image of the relevant object 103. In order to safeguard against this situation, the main device 101 may also include an alerting unit that generates an acoustic and/or mechanical alerting signal, which indicates that the video camera 105 is unable to record the original image 201 of the relevant object 103. This alerting signal is activated whenever the relevant object 103 is estimated to be, at least partially, located outside the recording range of the video camera 105.

Figure 6:
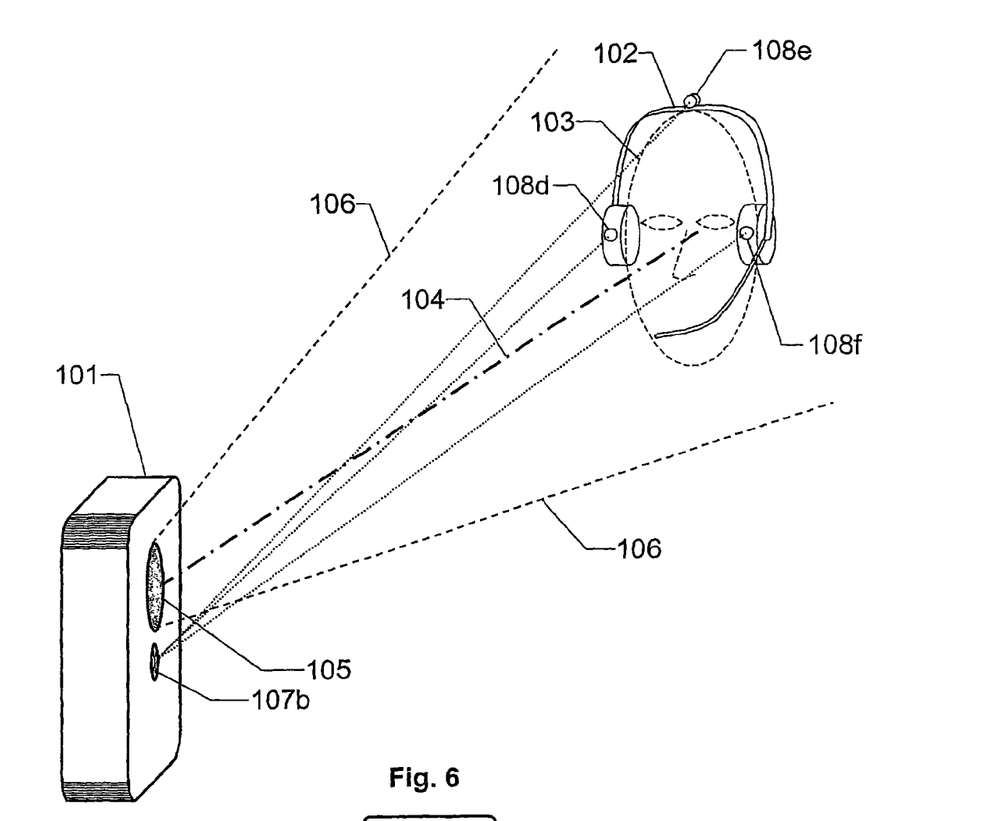
FIG. 6 shows a communication arrangement according to a second aspect of the invention.

FIG. 6 illustrates a communication arrangement according to a second aspect of the invention. Here the tracking points and automatic tracking sensors of FIG. 1 have changed positions. This means that the main device 101 besides the camera 105 also includes at least one tracking point 107b. The accessory device 102 comprises a number of automatic tracking sensors 108d, 108e and 108f that may be placed, for instance, on the earpieces respective the headband of a headset. Any other number and placement of the automatic tracking sensors 108d 108f on the accessory device is, of course, likewise conceivable. Three or more automatic tracking sensors 108d-108f is preferable, since this makes triangulation possible. In correspondence with the aspect of the invention described with reference to FIG. 1 each tracking sensor 108d-108f receives a signal from the tracking point(s) 107b. However, in order to minimise the weight of the accessory device 102 the means for deriving a target direction from the received signals is preferably located in the main device. Therefore, the tracking sensor signals must be forwarded to the main device 101 for processing in a tracking data generator. The signals from the automatic tracking sensors 108d-108f should be sent to the main device 101 via the most efficient available channel. If the main device 101 and the accessory device 102 are connected via a cable, if possible, this cable should be utilised. Otherwise, the signals may be transmitted over a wireless interface, such as a radio resource, an optical link or via a modulated magnetic inductive signal.

A target direction 104 between the main device 101 and the accessory device 102 is then derived on basis of the tracking sensor signals and a stabilized image of the relevant object 103 is produced as described earlier.

In order to further improve the accuracy and the reliability of the proposed solution tracking points and automatic tracking sensors may be placed both in the main device and in the accessory device, such that a first target direction can be derived based on measurements in the main device and a second target direction can be derived based on measurements in the accessory device. A resulting target direction is then preferably calculated as an average of the first and second target directions. Such doubling of the tracking points and automatic tracking sensors also introduces a degree of redundancy, which allows some sensors to be obscured without a reduction in the tracking performance.

Figure 7:
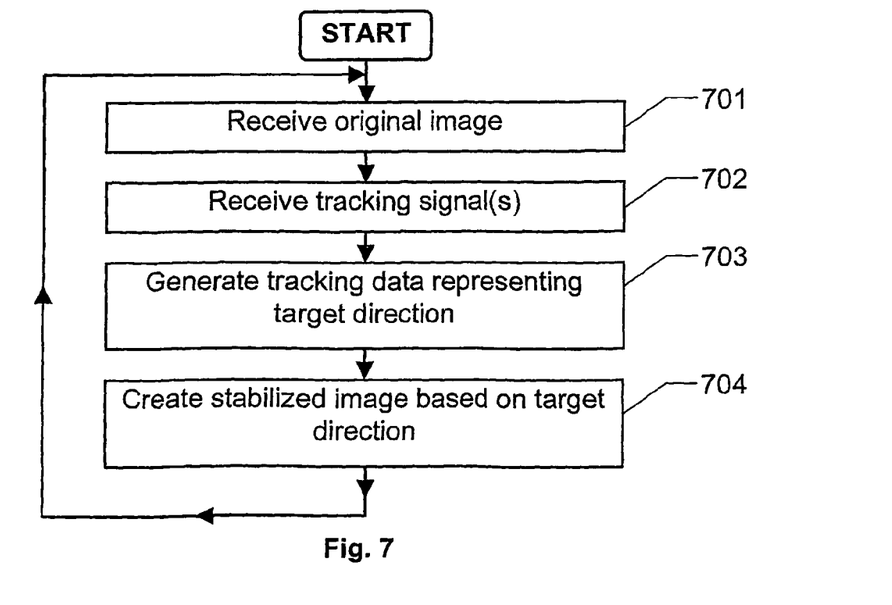
FIG. 7 illustrates the general method according to the invention by means of a flow diagram.

In order to sum up, the general method of the invention will now be described with reference to a flow diagram in FIG. 7.

An original image recorded by a camera in the main device is received in a first step 701. A subsequent step 702 receives at least one tracking signal from one or more automatic tracking sensors, located either in the main device, in the accessory device or both. A following step 703 generates tracking data representing a target direction between the main device and the accessory device on basis of the at least one signal from the automatic tracking sensors. Finally, a step 704 creates a stabilized image of a relevant object based on the target direction. The procedure then loops back to step 701 for reception of a new original image.

All the above mentioned process steps could, of course, be controlled by means of a computer program directly loadable into the internal memory of a computer, which includes appropriate software for controlling the necessary steps when the program is run on a computer. The computer program can likewise be recorded onto arbitrary kind of computer readable medium.

The term "comprises/comprising" when used in this specification is taken to specify the presence of stated features, integers, steps or components. However, the term does not preclude the presence or addition of one or more additional features, integers, steps or components or groups thereof.

The invention is not restricted to the described embodiments and aspects in the figures, but may be varied freely within the scope of the claims.

What is claimed is:

1. A method of producing an enhanced image of a relevant object recorded by a video camera in a main device, an accessory device being associated with the main device and co-located with the relevant object wherein,
locating at least one tracking point on at least a first device of the main device and the accessory device, wherein the at least one tracking point is a magnetic component, and
locating at least one automatic tracking sensor having a magnetic field sensor, responsive to the at least one tracking point, on at least a second device of the main device and the accessory device the method comprising the steps of:
generating tracking data representative of a target direction between the main device and the accessory device based on signals received by the at least one automatic tracking sensor;
creating a stabilized image of the relevant object by processing an original image recorded by the video camera on basis of the target direction; and
adaptively selecting a particular portion of the original image recorded by the video camera based on the target direction.

2. A method according to claim 1 wherein the step of generating the tracking data involves triangulation of signals received from at least three automatic tracking sensors.

3. A method according to claim 1, wherein said step of creating the stabilized image involves tilting at least an image-forming element in the video camera around at least a first axis relative to the main device.

4. A method according to claim 1, further comprising an image processing step in which the stabilized image is produced by utilising data from at least two consecutively recorded images.

5. A method according to claim 1, further comprising the step of generating an alerting signal indicating that the video camera is unable to record the original image of the relevant object when at least a part of the relevant object is estimated to be located outside a recording range of the video camera.

6. A method according to claim 1, wherein the at least one tracking point being located in the accessory device.

7. A method according to claim 1, wherein the at least one automatic tracking sensor being located in the main device.

8. A method according to claim 1, wherein the at least one tracking point being located in the main device.

9. A method according to claim 1, wherein the at least one automatic tracking sensor being located in the accessory device, and the method involving transferring tracking signals from the accessory device to the main device.

10. A method according to claim 1, wherein the accessory device being a headset for duplex exchange of audio information with the main device.

11. A communication arrangement including a main device and an associated accessory device, the main device including a video camera to record an original image of a relevant object, the accessory device being co-located with the relevant object comprising:
at least one tracking point located on at least a first device of the main device and the accessory device, wherein the at least one tracking point is a magnetic component,
at least one automatic tracking sensor, responsive to the at least one tracking point, located on at least a second device of the main device and the accessory device, wherein the at least one automatic tracking sensor includes a magnetic field sensor,
the main device comprises a tracking data generator, which receives at least one signal from the at least one automatic tracking sensor and generates in response thereto tracking data representing a target direction between the main device and the accessory device, and
the main device comprises an image controller, which creates a stabilized image of the relevant object based on the target direction and an original image recorded by the video camera, wherein the image controller produces the stabilized image of the relevant object by adaptively selecting a particular portion of the original image recorded by the video camera.

12. A communication arrangement according to claim 11, wherein
the second device includes at least three automatic tracking sensors which each generates a tracking signal, and wherein
the tracking data generator producing the tracking data by triangulation of the tracking signals.

13. A communication arrangement according to claim 11, wherein at least one image forming element in the video camera is tiltable around at least a first axis relative to the main device such that the image controller can create the stabilized image of the relevant object by processing an image recorded by the image forming element when being placed in a tilted position.

14. A communication arrangement according to claim 11, wherein the image controller includes an image processor for producing the stabilized image from data recorded in at least two consecutively recorded images.

15. A communication arrangement according to claim 11, wherein at least one automatic tracking sensor is constituted by the video camera.

16. A communication arrangement according to claim 15, wherein at least one tracking point is constituted by a marker that has a known and well defined appearance.

17. A communication arrangement according to claim 16, wherein the marker is located on the accessory device.

18. A communication arrangement according to claim 17, wherein the marker is adapted to reflect light that is emitted from a light source in the main device.

19. A communication arrangement according to claim 18, wherein the light source emits a flashing light according to a particular sequence, which is to be reflected by the tracking point.

20. A communication arrangement according to claim 15, wherein at least one tracking point being constituted by a pulsating light source that emits a flashing light according to a particular sequence, which is to be registered by the video camera.

21. A communication arrangement according to claim 11, wherein
at least one tracking point is a light source, and
at least one automatic tracking sensor includes a light sensor.

22. A communication arrangement according to claim 11, wherein
  at least one tracking point is an ultra-sound generator, and
  at least one automatic tracking sensor includes a microphone for reception of ultra-sonic sounds.

23. A communication arrangement according to claim 11, wherein
  at least one tracking point is a radio transmitter, and
  at least one automatic tracking sensor includes a radio receiver.

24. A communication arrangement according to claim 11, wherein at least one tracking point is located in the accessory device.

25. A communication arrangement according to claim 11, wherein at least one automatic tracking sensor is located in the main device.

26. A communication arrangement according to claim 11, wherein at least one tracking point is located in the main device.

27. A communication arrangement according to claim 11, wherein at least one automatic tracking sensor is located in the accessory device, and the accessory device includes a transmitter for transferring tracking signals to the main device.

28. A communication arrangement according to claim 11, wherein the main device is a mobile videophone.

29. A communication arrangement including a main device and an associated accessory device, the main device including a video camera to record an original image of a relevant object, the accessory device being co-located with the relevant object comprising:
  at least one tracking point located on at least a first device of the main device and the accessory device, wherein the at least one tracking point includes an accelerometer,
  at least one automatic tracking sensor, responsive to the at least one tracking point, located on at least a second device of the main device and the accessory device, wherein the at least one automatic tracking sensor includes an accelerometer,
  the main device comprises a tracking data generator, which receives at least one signal from the at least one automatic tracking sensor and generates in response thereto tracking data representing a target direction between the main device and the accessory device, the tracking data being generated from an estimated positional-directional relationship between the main device and the accessory device, the positional-directional relationship being derived from a comparison of signals generated by the at least one tracking point accelerometer with signals generated by the at least one automatic tracking sensor accelerometer, and
  the main device comprises an image controller, which creates a stabilized image of the relevant object based on the target direction and an original image recorded by the video camera, wherein the image controller produces the stabilized image of the relevant object by adaptively selecting a particular portion of the original image recorded by the video camera.

30. A method of producing an enhanced image of a relevant object recorded by a video camera in a main device, an accessory device being associated with the main device and co-located with the relevant object wherein,
  locating at least one tracking point having an accelerometer on at least a first device of the main device and the accessory device and
  locating at least one automatic tracking sensor having an accelerometer, responsive to the at least one tracking point, on at least a second device of the main device and the accessory device the method comprising the steps of:
  generating tracking data representative of a target direction between the main device and the accessory device based on signals received by the at least one automatic tracking sensor, the tracking data being generated from an estimated positional-directional relationship between the main device and the accessory device, the positional-directional relationship being derived from a comparison of signals generated by the at least one tracking point accelerometer with signals generated by the at least one automatic tracking sensor accelerometer;
  creating a stabilized image of the relevant object by processing an original image recorded by the video camera on basis of the target direction; and
  adaptively selecting a particular portion of the original image recorded by the video camera based on the target direction.

* * * * *